Oct. 7, 1958   F. H. MAY   2,855,427
CONTINUOUS PROCESS FOR PREPARATION OF PURE METHYL BORATE
Filed May 24, 1955
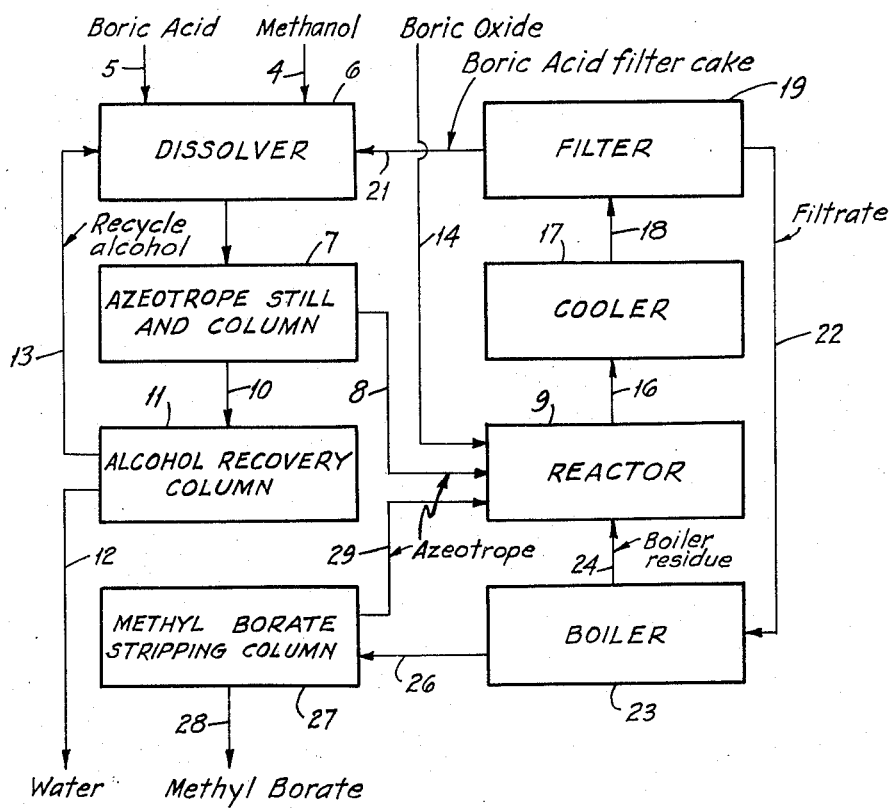
INVENTOR.
Frank Henderson May
ECKHOFF & SLICK
ATTORNEYS
BY
A MEMBER OF THE FIRM

United States Patent Office 2,855,427
Patented Oct. 7, 1958

2,855,427

CONTINUOUS PROCESS FOR PREPARATION OF PURE METHYL BORATE

Frank Henderson May, Whittier, Calif., assignor to American Potash & Chemical Corporation, a corporation of Delaware Application May 24, 1955, Serial No. 510,755

2 Claims. (Cl. 260—462)

This application is a continuation-in-part of my earlier application, Serial No. 467,880, filed November 9, 1954.

The present invention relates to a continuous process for the manufacture of methyl borate. The process of the present invention is particularly characterized in that both boric oxide and boric acid are utilized as boron sources to provide as the end products, water and methyl borate of high purity and quality. The reactions involved are as follows:

(1) $B_2O_3 + 3CH_3OH \rightarrow B(CH_3O)_3 + 3H_3BO_3$
(2) $H_3BO_3 + 3CH_3OH \rightarrow B(CH_3O)_3 + 3H_2O$ The use of boric acid and boric oxide as boron sources in formation of the ester is made possible through the use of a methyl borate-methanol azeotrope as a recycle medium.

It is in general the broad object of the present invention to provide a novel, simple and improved continuous process for the manufacture of methyl borate utilizing a methyl borate-methanol azeotrope and both boric oxide and boric acid as boron sources for the formation of methyl borate.

The invention includes other objects and features of advantage, some of which, together with the foregoing, will appear hereinafter wherein is set forth a present preferred process embodying the present invention. In the drawing accompanying and forming a part hereof, the single figure is a diagrammatic showing of a flow sheet and apparatus which can be utilized to practice the invention.

Referring to the drawing, boric acid and methanol are fed into a dissolver 6 respectively from sources 5 and 4 and from the process as at 21 and 13. In the dissolver the two are reacted to form methyl borate and which, with the methanol present, forms the methyl-borate methanol azeotrope. The resulting mixture is then passed to an azeotrope still and column 7, in which the azeotrope is removed and transferred through line 8 into a reactor 9. Alcohol and water are taken off through line 10 from the azetrope still and column and sent into the alcohol recovery column 11, wherein the alcohol is separated from water, the latter being removed to waste through line 12, while the alcohol is returned through line 13 to the dissolver 6.

Boric oxide is fed in through line 14 into the reactor 9, the boric oxide reacting with the methanol in the azeotrope to form additional methyl borate and boric acid, the resulting mixture being taken off through line 16 into a cooler 17 through line 18 to a filter 19. The boric acid filter cake is taken off through line 21 and is returned to the dissolver 6 while the filtrate is taken off through line 22 and is sent to a boiler 23, the boiler residue being returned through line 24 to the reactor 9, while the methyl borate-methanol azeotrope is transferred through line 26 into the methyl borate stripping column 27, from which methyl borate is removed through line 28 as a product and the azeotrope is sent through line 29 to the reactor 9.

As a specific example of an operation embodying the present invention, 93.54 pounds (2.92 moles) of methyl alcohol were fed through line 4 into the dissolver 6 along with 28.54 pounds (0.46 mole) of boric acid delivered through line 5 into the dissolver. 102.54 pounds (3.2 moles) of methyl alcohol were returned from the alcohol recovery column 11, while 21.57 pounds of wet filter cake were taken from filter 19 and returned to dissolver 6 through line 21; the filter cake contained 16.54 pounds (0.27 mole) of boric acid with the remainder being methyl borate. The mixture was then passed from the azeotrope still 7, from which an azeotrope containing 25.72 pounds (0.80 mole) of methyl alcohol and 77.15 pounds (0.74 mole) of methyl borate were sent to the reactor 9. 18.21 pounds (0.26 mole) of boric oxide were also added to the reactor 9 along with azeotrope from the methyl borate stripping column 27, the azeotrope containing 29.49 pounds (0.92 mole) of methyl alcohol and 88.46 pounds (0.85 mole) of methyl borate. Also returned from the reactor from the boiler was the boiler residue made up of 19.23 pounds (0.185 mole) of methyl borate, and 19.23 pounds (0.28 mole) of boric oxide. The mixture issuing from the reactor was sent to the cooler 17, thence to the filter 19, from which was removed the aforementioned wet filter cake. 100 pounds (0.96 mole) of methyl borate were taken off as product through line 28, while the water taken to waste through line 12 contained 37.51 pounds (2.08 moles) of water, 2.15 pounds (0.03 mole) of boric oxide and 1.10 pounds (0.03 mole) of methyl alcohol.

From the foregoing, I believe it will be apparent that I have prepared a novel, simple and improved process for the continuous preparation of methyl borate. The boric acid can be provided as such or it can be formed in situ or separately or provided by an equivalent source, e. g., borax or anhydrous borax.

I claim:

1. A process for forming trimethyl borate comprising first reacting orthoboric acid and an excess of methanol to form a mixture of a trimethyl borate-methanol azeotrope, methanol and water; distilling the mixture to separate the azeotrope as one fraction from the methanol and water as a second fraction; separating the water and methanol from one another and returning the methanol to the aforementioned first reaction step; adding to the separated trimethyl borate-methanol azeotrope sufficient boric oxide to react with the methanol in the azeotrope to form trimethyl borate and orthoboric acid and release the trimethyl borate held by the methanol in said azeotrope; cooling said mixture to precipitate the orthoboric acid; separating the orthoboric acid from the mixture; returning the orthoboric acid to the aforementioned first reaction step; and recovering trimethyl borate from the mixture.

2. A process for forming trimethyl borate comprising first reacting boric acid and methanol to form a mixture of a trimethyl borate-methanol azeotrope, methanol and water; distilling the mixture to separate the azeotrope as one fraction from the methanol and water as a second fraction; adding to the separated trimethyl borate-methanol azeotrope sufficient boric oxide to react with the methanol in said azeotrope to form boric acid and trimethyl borate and to release the trimethyl borate held by the methanol in said azeotrope; separating the boric acid from the mixture; returning the boric acid to the aforementioned first reaction step; and recovering the trimethyl borate from the remainder of the mixture.

References Cited in the file of this patent

UNITED STATES PATENTS

| | | |
|---|---|---|
| 2,217,354 | Appel | Oct. 8, 1940 |
| 2,262,187 | Lytle | Nov. 11, 1941 |
| 2,808,424 | May | Oct. 1, 1957 |

OTHER REFERENCES

Schlesinger et al.: J. Am. Chem. Soc., 75, pp. 213–215 (1953).